United States Patent [19]

Hwang

[11] Patent Number: 5,696,554
[45] Date of Patent: Dec. 9, 1997

[54] CCD-DEFECT COMPENSATING METHOD AND APPARATUS FOR CAMCORDER

[75] Inventor: Jeong Hwan Hwang, Seoul, Rep. of Korea

[73] Assignee: LG Electronics, Inc., Seoul, Rep. of Korea

[21] Appl. No.: 456,750

[22] Filed: Jun. 1, 1995

[30] Foreign Application Priority Data

Jun. 2, 1994 [KR] Rep. of Korea ............... 12438/1994

[51] Int. Cl.$^6$ ............................................. H04N 9/64
[52] U.S. Cl. ............................................. 348/246
[58] Field of Search ............................. 348/207, 241, 348/246, 247, 616; 382/272, 269, 254; H04N 9/64, 5/217

[56] References Cited

U.S. PATENT DOCUMENTS

4,920,428  4/1990  Lin et al. ................ 348/246
5,047,861  9/1991  Houchin et al. ............ 348/246
5,436,659  7/1995  Vicent ..................... 348/246

*Primary Examiner*—Andrew Faile
*Assistant Examiner*—Tuan V. Ho
*Attorney, Agent, or Firm*—John P. White

[57] ABSTRACT

A CCD-defect compensating method for a camcorder is disclosed including the steps of: sequentially delaying input pixel data; operating the values of pixels preceding and behind two stages from an nth pixel, and comparing the operated value with a reference level value to detect the presence or absence of a defect; averaging the pixel data two stages preceding and behind the nth pixel having the defect, to thereby obtain the nth pixel data; deciding the position of the defect to thereby generate a defect compensating control signal; and selectively compensating only for the pixel data averaged in the averaging step or the pixel data having the defect and delayed in the pixel delaying step, and outputting the compensated data with the original (externally input) pixel data.

17 Claims, 4 Drawing Sheets

CCD-DEFECT COMPENSATING METHOD AND APPARATUS FOR CAMCORDER

BACKGROUND OF THE INVENTION

The present invention relates to a CCD-defect compensating method and apparatus for a camcorder, and more particularly, to a CCD-defect compensating method and apparatus for a CCD, which detects a defect caused due to the structure of the CCD in processing the image of a target photographed by a digital camcorder, and optimally compensates for the detect according to the kinds thereof, to thereby restore the original image.

Generally speaking, in camera signal processing for a camcorder, when the optical image of a target to be photographed is formed on a CCD, this CCD converts it into an electric signal, which is then processed into an analog signal. This analog signal is finally displayed or recorded on a recording medium as the target image.

However, as camcorders have been generally used in recent years, the image of a target to be photographed is digitally processed. Digital processing makes the image sharper.

In this situation, the CCD used in analog processing is still employed to digital processing. This is because the CCD is very expensive in production cost. Therefore, the CCD must be employed to digital camcorders.

However, since the CCD used in analog processing is utilized to a digital camcorder without change, the original image cannot be restored due to the CCD's defect caused by its structure.

In order to solve this problem, the position of the defect caused due to the CCD's structure is previously stored in a defect-correcting data RAM or ROM, and information at the position of the defect is replaced with the preceding information. This compensates for a signal at the position where the defect is caused.

Figure 1:
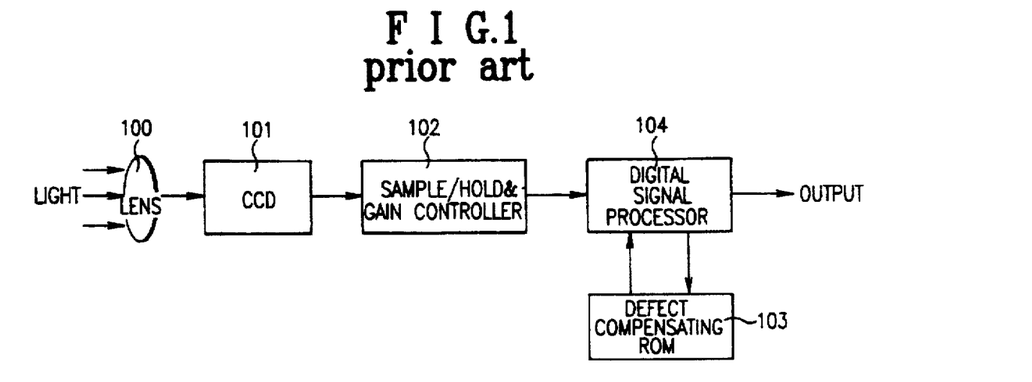
FIG. 1 is a block diagram of a conventional defect compensating apparatus for a camcorder.

Such a conventional CCD-defect compensating apparatus for a camcorder, as shown in FIG. 1, comprises a CCD 101 for converting the optical image of a target passing through a lens system 100 into an electric signal, a sample/hold & gain controller 102 for sampling/holding the electric signal output after being converted in CCD 101 into color-separating pulses in accordance with color phases, separating it into three channels of yellow, green and cyan, and gain-controlling the separated signals of the three channels, a defect compensating ROM 103 for previously storing compensation data for the position of the defect of CCD 101, and a digital signal processor 104 for digitally processing the three-channel signals gain-controlled in sample/hold & gain controller 102 into three primary-color signals of red, green and blue, and reading the compensation data for the position of the defect from defect compensating ROM 103 when the defect is caused among the three-channel signals, to thereby replace the defect with the compensation data.

In the CCD-defect compensating apparatus for a CCD, first, the optical image of a target passing through the focus lens of lens system 100 is formed on CCD 101. The optical image is converted into an electric signal in CCD 101. The electric signal converted in CCD 101 is fed to sample/hold & gain controller 102.

Sequentially color-separated signals of yellow, green and cyan of sample/hold & gain controller 102 are separated from the electric signal. These color-separated signals are sampled/held into color-separating pulses in accordance with the respective color phases, and separated into three-channel signals of yellow, green and cyan. These three-channel signals are gain-controlled to an established level in sample/hold & gain controller 102, and supplied to digital signal processor 104.

The three-channel signals obtained through the gain control in sample/hold & gain controller 102 are digitally processed into three primary signals of red, green and blue in digital signal processor 104.

Here, digital signal processor 104 digitally processes the three-channel signals from sample/hold & gain controller 102 into three primary signals of red, green and blue, and when the position of the defect caused by the CCD 101 arrives, reading the compensation data corresponding to the position of the defect from defect compensating ROM 103 to thereby replace it with the data.

This procedure will be explained in detail with reference to FIGS. 2 and 3A–3C.

Figure 2:
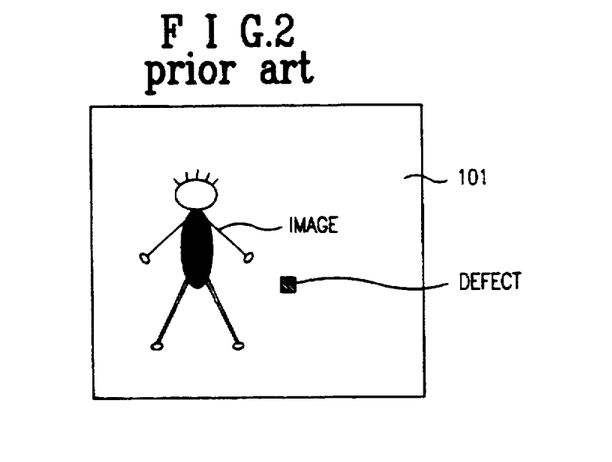
FIG. 2 illustrates an image formed on a CCD and a defect created thereby, which is to explain the operation of FIG. 1.

As shown in FIG. 2, when a defect is created in CCD 101, the optical image passing through lens system 100 is not formed at the portion of the defect. In this state there is no pixel, an electric signal, at the portion. This situation is digitally processed through sample/hold & gain controller 102, producing an awkward portion, as compared with the surrounding image.

Figure 3A:
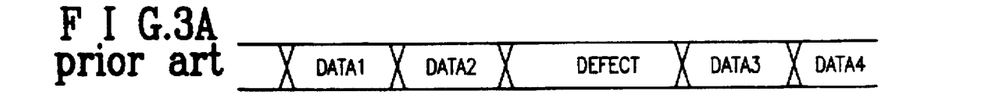
FIGS. 3A, 3B and 3C are operation timing diagrams for illustrating the process of compensating for defect data in the conventional defect compensating apparatus of FIG. 1, FIG. 3A showing input data to the digital signal processor, FIG. 3B showing the signal waveform of compensation data of the defect compensating ROM, and FIG. 3C being data restored according to the compensation data.
Figure 3B:
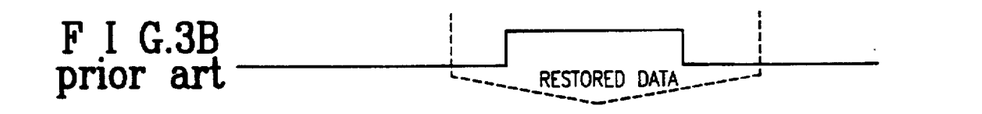
Figure 3C:
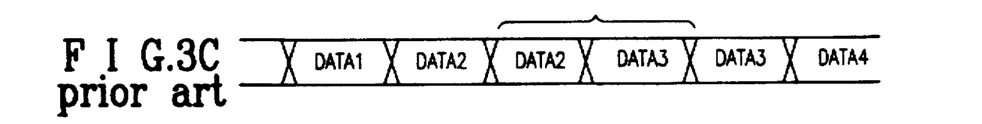

For this reason, while digital signal processor 104 processes the data of the target input from sample/hold & gain controller 102 as depicted in FIG. 3A, when the signal for the defect portion of CCD 101 is input, data preceding or behind the defect is output from defect compensating ROM 103 as shown in FIG. 3B so that the defect portion is replaced with the data. That is, digital signal processor 104 digitally processes the data input from sample/hold & gain controller 102 and the compensation data corresponding to the defect portion from defect compensation ROM 103, restoring the original image data, as shown in FIG. 3C.

The conventional defect compensating apparatus for a camcorder is made in such a manner that the position of a defect of the CCD is previously stored by using a RAM or ROM and only the defect portion is compensated for. In other words, only the manufacturer that makes the CCD can know information on the defect portion. Therefore, companies that manufacture sets using the CCD must use ROMs or RAMs the manufacturer supplies. In addition, the compensation method is a simple replacement, which enables compensation only for a fixed defect. Other defects between individual CCD devices cannot be compensated for because they are not detected in the compensation method.

SUMMARY OF THE INVENTION

Therefore, it is an object of the present invention to provide a CCD-defect compensating method and apparatus for a camcorder in which defect data of an image generated due to the defect of a CCD is detected by using the similarity of the image in processing the image of a target photographed by a digital camcorder, and the data is optimally compensated for according to the kinds of the defect, to thereby restore the original image.

It is another object of the present invention to provide a CCD-defect compensating method and apparatus for a camcorder in which, without a ROM or RAM that stores the defect position of the CCD previously, defects are detected and compensated for instantly, by comparing data preceding and behind the position of the CCD-defect, and which is capable of being employed to any kind of CCDs.

To accomplish the objects of the present invention, there is provided a CCD-defect compensating apparatus for a camcorder comprising: a pixel delay for sequentially delaying one field of channel pixel data of a target which is sampled/held in color-separating pulses according to color phases to be thereby separated into respective channel signals, and gain-controlled to a predetermined level; a defect detecting portion for operating the second pixel data delayed by the pixel delay and a pixel two stages behind from the second pixel, operating the fifth pixel and a pixel two stages behind from the fifth pixel, and comparing the operated values with the reference level value to detect the presence or absence of a defect; an averaging portion for, when a defect is created in nth pixel data delayed by the pixel delay, averaging pixels two stages preceding and behind the nth pixel having the defect to thereby obtain the data of the nth pixel having the defect; a defect compensating control signal generator for deciding the position of the defect according to the defect detection result of the defect detecting portion and generating a defect compensating control signal; and a defect compensating portion for selectively compensating only for the pixel data averaged in the averaging portion or the pixel data having the defect and delayed in the pixel delay, according to defect compensating control signals generated from the defect compensating control signal generator and an externally input defect compensating control signal, and outputting the compensated data with the original (externally input) pixel data.

To accomplish the objects of the present invention, there is provided a CCD-defect compensating method for a camcorder comprising the steps of: sequentially delaying input pixel data; operating the values of pixels preceding and behind two stages from an nth pixel among pixels obtained by being delayed in the pixel delaying step, and comparing the operated value with a reference level value to detect the presence or absence of a defect; averaging the pixel data two stages preceding and behind the nth pixel having the defect, when a defect is created in the nth pixel data delayed in the pixel delaying step, to thereby obtain the nth pixel data; deciding the position of the defect according to the result of the defect detecting step to thereby generate a defect compensating control signal; and selectively compensating only for the pixel data averaged in the averaging step or the pixel data having the defect and delayed in the pixel delaying step, according to defect compensating control signals generated from the defect compensating control signal generating step and an externally input defect compensating control signal, and outputting the compensated data with the original (externally input) pixel data.

DETAILED DESCRIPTION OF THE INVENTION

Hereinafter, a preferred embodiment of the present invention will be described below with reference to the attached drawings.

Figure 4:
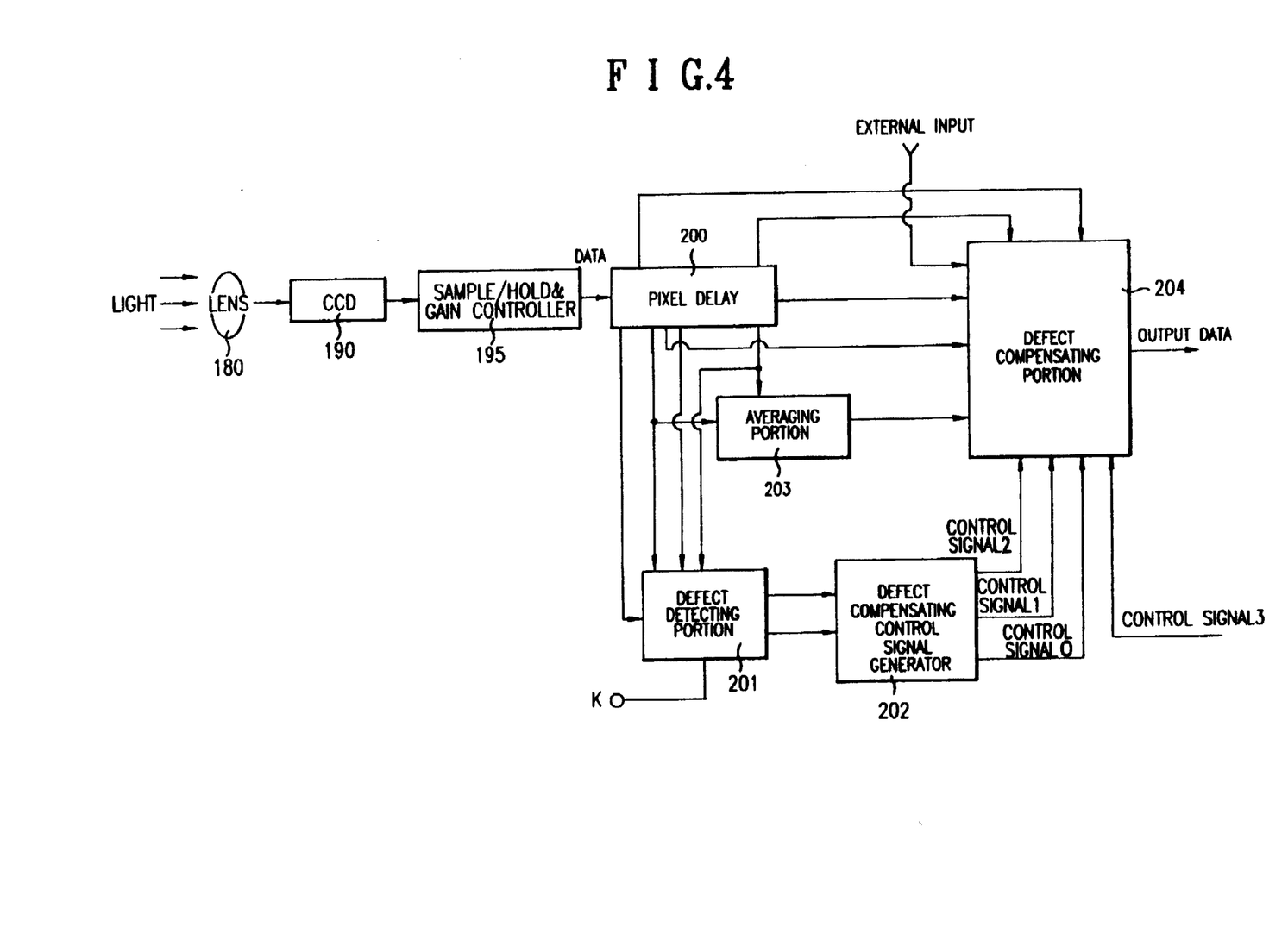
FIG. 4 is a block diagram of a defect compensating apparatus for a camcorder according to the present invention.

Referring to FIG. 4, the defect compensating apparatus of the present invention comprises a pixel delay 200 for sequentially delaying one field of channel pixel data of a target which is converted into an electric signal through lens system 180 and CCD 190, sampled/held in color-separating pulses according to color phases to be thereby separated into respective channel signals through sample/hold & gain controller 195, and gain-controlled to a predetermined level, a defect detecting portion 201 for deciding the second pixel data delayed by pixel delay 200 and pixel data behind two stages from the second pixel data, operating the fifth pixel and pixel data behind two stages from the fifth pixel data, and comparing the operated values with reference level value K to detect the presence or absence of a defect, an averaging portion 203 for, when a defect is created in nth pixel data delayed by pixel delay 200, averaging pixels two stages preceding and behind the nth pixel having the defect, a defect compensating control signal generator 202 for operating the position of the defect according to the defect detection result of defect detecting portion 201 and generating a defect compensating control signal, and a defect compensating portion 204 for selectively compensating only for the pixel data averaged in averaging portion 203 or the pixel data having the defect and delayed in pixel delay 200, and outputting the compensated data with the original (externally input) pixel data.

Pixel delay 200 is constructed to serially connect first-eighth delays (200a–200h) for delaying the input pixel data DATA for a predetermined time, respectively, so that the final output is input to defect compensating portion 204.

Defect detecting portion 201 comprises a first adder 201a for adding the pixel data delayed by second delay 200b of pixel delay 200 to the pixel data of third delay 200c which is behind one stage from second delay 200b, a second adder 201b for adding the pixel data delayed by fifth delay 200e of pixel delay 200 to the pixel data of seventh delay 200g which is behind two stages from fifth delay 200e, first and second absolute value circuits 201c and 201d for taking the absolute value of the results of first and second adders 201a and 201b, and first and second comparators 201e and 201f for comparing the absolute values taken by first and second absolute value circuits 201c and 201d with a reference level value K and outputting the result to defect compensating control signal generator 202.

Figure 6:
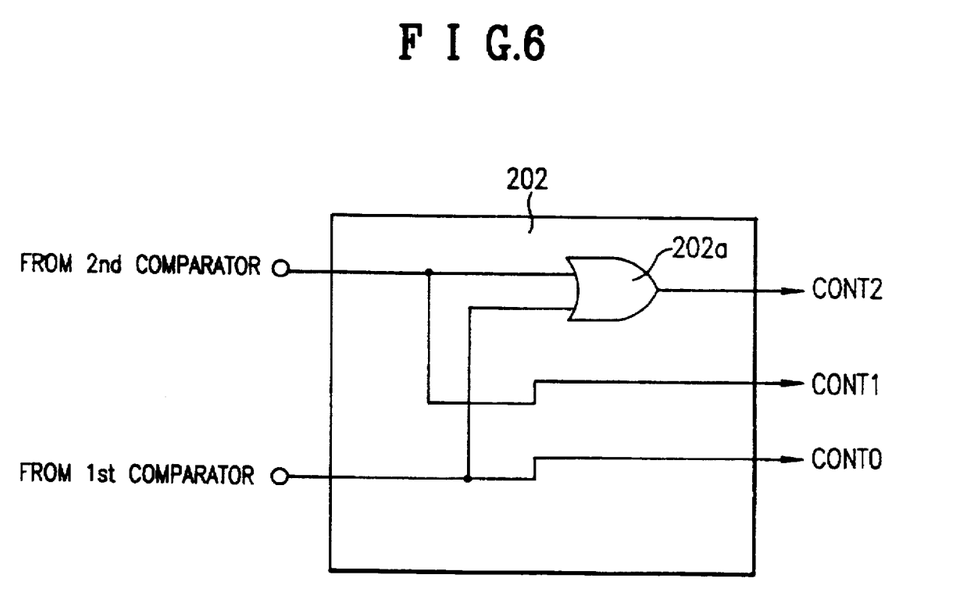
FIG. 6 is a diagram which illustrates the defect compensating control signal generator of FIG. 5 in more detail.

As shown in FIG. 6, defect compensating control signal generator 202 has an OR gate 202a for logically summing the result signals compared in first and second comparators 201e and 201f of defect detecting portion 201 and outputting the result as second defect compensating control signal $CONT_2$. In this generator, the result signals compared in first and second comparators 201e and 201f are input directly to defect compensating portion 204 as first defect compensating control signals $CONT_0$ and $CONT_1$.

Averaging portion 203 has a third adder 203a for adding the pixel data delayed in third delay 200c of pixel delay 200 to the pixel data delayed in seventh delay 200g, and a multiplier 203b for averaging the result signal of third adder 203a and inputting the result to defect compensating portion 204.

Defect compensating portion 204 comprises a first pixel selector 204a switched by first defect compensating control signals $CONT_0$ and $CONT_1$ of defect compensating control signal generator 202 and selectively outputting pixel data having no defect, the output pixel data of fourth and eighth delays 200d and 200h of pixel delay 200, and an external input, a second pixel selector 204b switched by second defect compensating control signal $CONT_2$ of defect compensating control signal generator 202 and selectively outputting the output pixel data of first pixel selector 204a and the output pixel data of sixth delay 200, and a third pixel selector 204c switched by third (externally input) defect compensating control signal $CONT_3$ and selectively outputting the pixel data delayed by first delay 200a and the pixel data selected by second pixel selector 204b to thereby output the final pixel data having the defect compensated for.

First-eighth delays 200a–200h are made up of D flipflops.

The operation and effect of the present invention will be described below with reference to FIGS. 4, 5 and 6.

Figure 5:
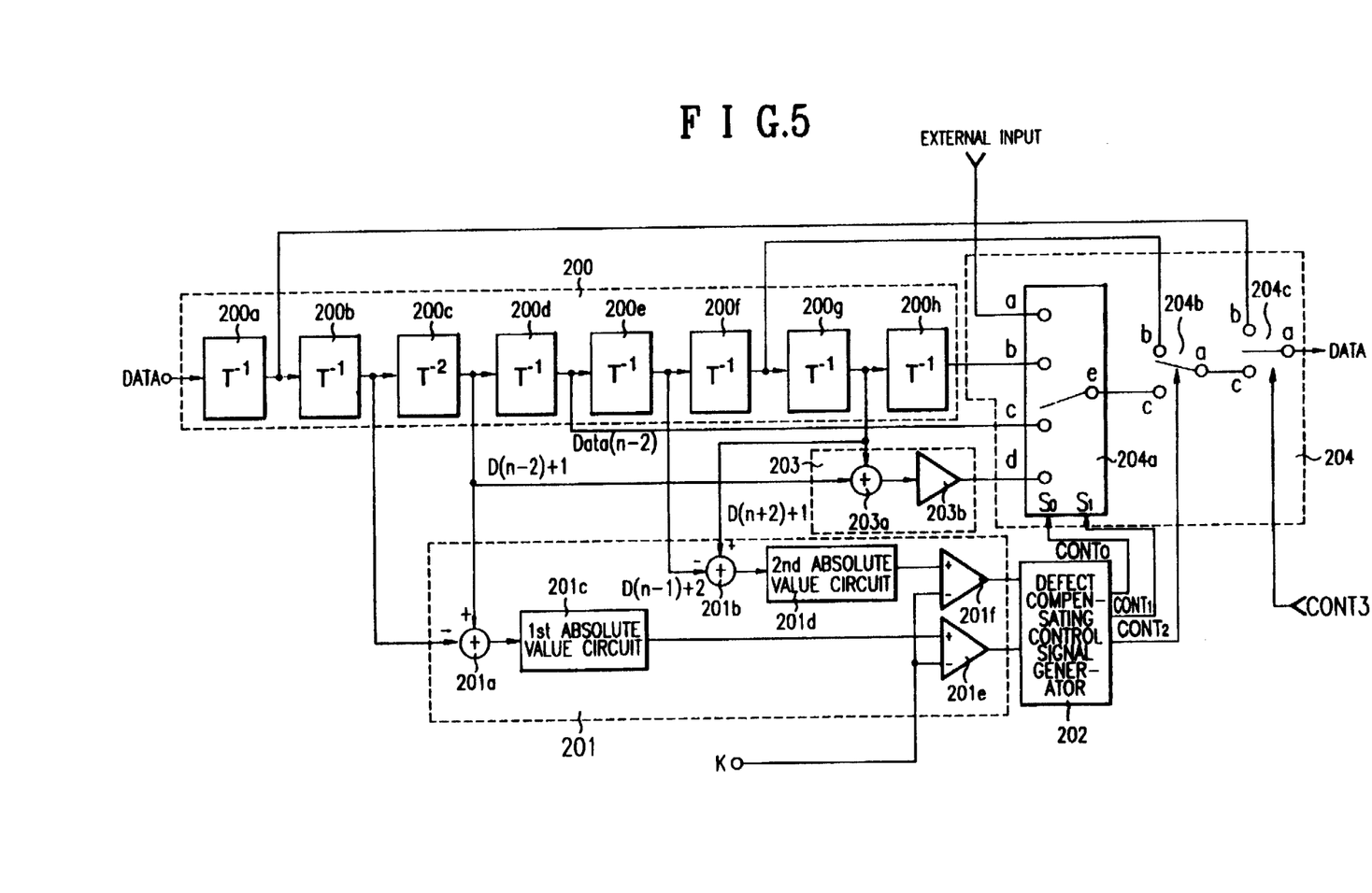
FIG. 5 is a circuit diagram of the defect compensating apparatus for a camcorder according to the present invention.

First, as shown in FIG. 4 and 5, when one field of channel pixel data of a target which is converted into an electric signal through lens system 180 and CCD 190, sampled/held in color-separating pulses according to color phases to be thereby separated into respective channel signals through sample/hold & gain controller 195, and gain-controlled to a predetermined level, is input to pixel delay 200, pixel delay 200 sequentially delays pixel data input in order. Specifically, given that pixel data DATA from sample/hold & gain controller 200 is output in the sequence of n−3, n−2, n−1, n, n+1, n+2 and n+3 and input to pixel delay 200, first-eighth delays 200a–200h of pixel delay 200 sequentially delay the input pixel data and input them to defect compensating portion 204, averaging portion 203 and defect detecting portion 201.

Here, third adder 203a of averaging portion 203 adds pixel data [D(n−2)+1] delayed in third delay 200c of pixel delay 200, to pixel data [D(n+2)+1] delayed in seven delay 200g which is behind four stages from the third delay. Pixel data [D(n+2)–D(n−2)], the result added in third adder 203a of averaging portion 203, is averaged in multiplier 203b and input to fixed port d of first pixel selector 204a of defect compensating portion 204.

First adder 201a of defect detecting portion 201 adds pixel data [D(n−3)+2] delayed in second delay 200b of pixel delay 200, to pixel data [D(n−1)+2] delayed in third delay 200c which is behind two stages from the second delay.

The absolute value of pixel data [D(n−1)–D(n−3)], the result added in first adder 201a, is taken in first absolute value circuit 201c and input to non-inverting port+ of first comparator 201e.

Second adder 201b of defect detecting portion 201 adds pixel data [D(n−1)+2] delayed in fifth delay 200e which is behind two stages from third delay 200c of pixel delay 200, to pixel data [D(n+2)+1] delayed in seventh delay 200g which is behind two stages from the fifth delay.

The absolute value of pixel data [D(n+3)–D(n+1)] output from second adder 201b is taken in second absolute value circuit 201d and input to non-inverting port+ of second comparator 201f.

First and second comparators 201e and 201f compare pixel data |D(n−1)–D(n−3)| and |D(n+3)–D(n+1)| of first and second absolute value circuits 201c and 201d input via the non-inverting port+ and reference level value K input to the non-inverting port−. If reference level value K is greater than the pixel data, that is, when there is no defect in nth pixel data, binary of 0, 0 is output and input to defect compensating control signal generator 202. Absolute value pixel data |D(n−1)–D(n−3)| and |D(n+3)–D(n+1)| are greater than reference level value K, that is, when the nth pixel data has a defect, binary of 1, 1 is output.

When binary of 0, 0 is input from first and second comparators 201e and 201f, OR gate 202a of defect compensating control signal generator 202 logically sums them and outputs a low potential as second defect compensating control signal $CONT_2$ so that movable port a of second pixel selector 204b of defect compensating portion 204 is switched to fixed port b. Defect compensating control signal generator 202 inputs binary of 0, 0 of first and second comparators 201e and 201f to selection ports $S_0$ and $S_1$ of first pixel selector 204a of defect compensating portion 204 as first defect compensating control signals $CONT_0$ and $CONT_1$. By doing so, movable port e of first pixel selector 204a does not select the pixel data input to fixed ports b, c and d but the external input fed to fixed port a.

When first defect compensating control signals $CONT_0$ and $CONT_1$ of defect compensating control signal generator 202 is input to selection ports $S_0$ and $S_1$ of first pixel selector 204a as "0, 0," movable port e is switched to fixed port a so that first pixel selector 204a of defect compensating portion 204 selects the external input. If first defect compensating control signals $CONT_0$ and $CONT_1$ are input as "0, 1," movable port e is switched to fixed port b. If the signals are input as "1, 0," movable port e is switched to fixed port c. If they are input as "1, 1," movable port e is switched to fixed port d.

When there is no defect, in second pixel selector 204b of defect compensating portion 204, its movable port a is switched to fixed port b by the low potential of second defect compensating control signal $CONT_2$ of defect compensating control signal generator 202 so that the nth pixel data delayed by sixth delay 200f of pixel delay 200 is selected and input to fixed port c of third pixel selector 204c.

Movable port a of third pixel selector 204c is switched to fixed port c by the high potential of externally input third defect compensating control signal $CONT_3$ so that the nth pixel data having no defect and selected by second pixel selector 204b is selected and output.

In case than there is a defect in the nth pixel data, when absolute value pixel data |D(n−1)–D(n−3)| and |D(n+3)–D(n+1)| of first and second comparators 201e and 201f of defect detecting portion 201 are compared with reference level value K, if pixel data |D(n−1)–D(n−3)| taken by first absolute value circuit 201c is smaller than reference level value K and pixel data |D(n+3)–D(n+1)| taken in second absolute value circuit 201d is greater than reference level value K, first comparator 201e outputs "0." Second comparator 201f outputs "1" and inputs it to OR gate 202a of defect compensating control signal generator 202.

OR gate 202a of defect compensating control signal generator 202 logically sums binary of 0, 1 input from first and second comparators 201e and 201f, and outputs a high potential as second defect compensating control signal $CONT_2$ so that movable port a of second pixel selector 204b of defect compensating portion 204 is switched to fixed port c. Defect compensating control signal generator 202 inputs binary of 0, 1 of the result compared in first and second comparators 201e and 201f to selection ports $S_0$ and $S_1$ of defect compensating portion 204 as first defect compensating control signals $CONT_0$ and $CONT_1$. By doing so, movable port e of first pixel selector 204a of defect compensating portion 204 is switched to fixed port b.

First pixel selector 204a of defect compensating portion 204 selects pixel data D(n+2) delayed in eighth delay 200h of pixel delay 200. This pixel data is input to fixed port c of third pixel selector 204c via second pixel selector 204b.

Movable port a of third pixel selector 204c is switched to fixed port c by the high potential of externally input third defect compensating control signal $CONT_3$ so that pixel data D(n+2) having the defect compensated and selected by second pixel selector 204b is selected. If there is a defect in the nth pixel data, since pixel data greater than reference level value k has no defect, pixel data D(n+2) behind two stages from the nth pixel data is selected so that the data at the defect position is compensated for.

According to the comparison result of reference level value K and pixel data |D(n−1)−D(n−3)| and |D(n+3)−D(n+1)| of first and second comparators 201e and 201f of defect detecting portion 201, if pixel data |D(n−1)−D(n−3)| taken by first absolute value circuit 201c is greater than reference level value K and pixel data |D(n+3)−D(n+1)| taken by second absolute value circuit 201d is smaller than reference level value K, first comparator 201e outputs "1." Second comparator 201 outputs "0" and inputs it to OR gate 202a of defect compensating control signal generator 202 and a decoder.

OR gate 202a logically sums binary of 1, 0 input from first and second comparators 201e and 201f and outputs the high potential as second defect compensating control signal $CONT_2$ so that movable port a of second pixel selector 204b of defect compensating portion 204 is switched to fixed port c. Binary of "1, 0" of the result compared in first and second comparators 201e and 201f is input to selection ports $S_0$ and $S_1$ of first pixel selector 204a of defect compensating portion 204 as first defect compensating control signals $CONT_0$ and $CONT_1$ via defect compensating control signal generator 202.

First pixel selector 204a switches movable port a to fixed port c by first defect compensating control signals $CONT_0$ and $CONT_1$, that is, "1, 0," directly input from defect compensating control signal generator 202.

First pixel selector 204a of defect compensating portion 204 selects pixel data D(n−2) delayed in fourth delay 200d of pixel delay 200 and inputs it to fixed port c of third pixel selector 2-4c via second pixel selector 204b. Here, movable port a of third pixel selector 204c is switched to fixed port c by the high potential of externally input third defect compensating control signal $CONT_3$ so that pixel data D(n−2) having the defect compensated and selected by second pixel selector 204b is selected.

If there is a defect in the nth pixel data, since pixel data smaller than reference level value k has no defect, pixel data D(n−2) preceding two stages from the nth pixel data is selected so that the data at the defect position is compensated for.

According to the comparison result of first and second comparators 201e and 201f of defect detecting portion 201, pixel data |D(n−1)−D(n−3)| and |D(n+3)−D(n+1)| both are greater than reference level value K, this means there is a defect in the two absolute value pixel data. In this case, first and second comparators 201e and 201f output "1, 1," which are input to defect compensating control signal generator 202.

As stated above, OR gate 202a of defect compensating control signal generator 202 logically sums binary of 1, 1 input from first and second comparators 201e and 201f and outputs the high potential as second defect compensating control signal $CONT_2$ so that movable port a of second pixel selector 204b of defect compensating portion 204 is switched to fixed port c. Defect compensating control signal generator 202 inputs binary of "1, 1" input from first and second comparators 201e and 201f to selection ports $S_0$ and $S_1$ of first pixel selector 204a of defect compensating portion 204 as first defect compensating control signals $CONT_0$ and $CONT_1$. This switches movable port e of first pixel selector 204a to fixed port d.

First pixel selector 204a of defect compensating portion 204 selects pixel data averaged to [D((n+2)+D(n−2)]/2 in averaging portion 203 and inputs it to fixed port c of third pixel selector 204c via second pixel selector 204b.

Movable port a of third pixel selector 204c is switched to fixed port c by the high potential of externally input third defect compensating control signal $CONT_3$ so that pixel data [D(n+2)+D(n−2)]/2 having the defect compensated and selected by second pixel selector 204b is selected and output.

The averaged result is that compensated for with the average of the (n+2)th and (n−2)th pixel data having no defect, instead of the nth pixel data having a defect.

In the CCD data, nth data and n+2 and n−2 data preceding or behind two stages are the same color filter outputs so that neighboring images have a small difference in level.

|D(n−1)−D(n−3)| is obtained from this level difference. If this value is greater than reference level value K, there is a large difference due to the defect.

In other words, levels between neighboring images are compared in the three aforementioned forms so that the presence of defect can be detected without a ROM or RAM on a signal flow. Between pixels having absolute values |D(n−1)−D(n−3)| and |D(n+3)−D(n+1)|, the pixel data greater than reference level value K is different from the original image. Therefore, the pixel data smaller than reference level value K is selected and output for compensation.

If pixel data having absolute values |D(n−1)−D(n−3)| and |D(n+3)−D(n+1)| are smaller or greater than reference level value K, the two values are averaged. This restores the closest data to the original image.

As described above, without the ROM or RAM that previously stores the defect position of the CCD, the present invention directly detects defects of data at once. Therefore, the present invention can be employed to any kinds of CCD, increasing compensation capability. In addition, in this invention, detecting the defect is performed not by simple compensation but by comparing (n+2)th and (n−2)th pixel data, improving the restoration of the original image in accordance with the kinds of defect.

What is claimed is:

1. A CCD-defect compensating method for a camcorder comprising the steps of:

sequentially delaying input pixel data;

operating the values of pixels preceding and behind two stages from an nth pixel among pixels obtained by being delayed in said pixel delaying step, and comparing the operated value with a reference level value to detect the presence or absence of a defect;

averaging the pixel data two stages preceding and behind the nth pixel having the defect, when a defect is created in the nth pixel data delayed in said pixel delaying step, to thereby obtain the nth pixel data;

deciding the position of the defect according to the result of said defect detecting step to thereby generate a defect compensating control signal; and selectively compensating only for the pixel data averaged in said averaging step or the pixel data having the defect and delayed in said pixel delaying step, according to defect compensating control signals generated from said defect compensating control signal generating step and an externally input defect compensating control signal, and outputting the compensated data.

2. A CCD-defect compensating method for a camcorder as claimed in claim 1, wherein in said pixel delaying step, serially input pixels are delayed sequentially for respective pixels with respect to one field of pixels.

3. A CCD-defect compensating method for a camcorder as claimed in claim 1, wherein said averaging step comprises the steps of:

adding the third pixel obtained in said pixel delaying step to a pixel four stages behind the pixel; and averaging the added pixels.

4. A CCD-defect compensating method for a camcorder as claimed in claim 3, wherein, if the value of the nth pixel is greater than the reference level value, the defect of the nth pixel is compensated for by averaging the (n−2)th and (n+2) pixels two stages preceding and behind the nth pixel.

5. A CCD-defect compensating method for a camcorder as claimed in claim 1, wherein said defect detecting step comprises the steps:

operating the second pixel obtained in said pixel delaying step and the pixel two stages behind the second pixel;

taking the absolute value of the result of the operated pixel; and comparing the absolute value of the pixel with the reference level value to thereby detect the presence of the defect and generate a binary number according to the result.

6. A CCD-defect compensating method for a camcorder as claimed in claim 1, wherein in said defect compensating control signal generating step, the binary numbers obtained in said defect detecting step are logically summed to output a second defect compensating control signal, and the binary numbers output in said defect detecting step are output directly as first defect compensating control signals.

7. A CCD-defect compensating method for a camcorder as claimed in claim 1, wherein said defect compensating step comprises the steps of:

being switched by said first defect compensating control signals in said defect compensating control signal generating step and selectively outputting an external input, fourth and eighth pixel data obtained in said pixel delaying step, and a pixel having the defect compensated in said averaging step;

being switched by said second defect compensating control signal in said defect compensating control signal generating step and selectively outputting the output pixel data of said first pixel selecting step and the sixth pixel obtained from said pixel delaying step; and being switched by said third (externally input) defect compensating control signal and selecting the first pixel obtained in said pixel delaying step or the output pixel of said second pixel selecting step to thereby output the final pixel data having the defect compensated for.

8. A CCD-defect compensating method for a camcorder as claimed in claim 1, wherein in said defect compensating step, of pixels having absolute values |D(n−1)−D(n−3)| and |D(n+3)−D(n+1)|, the pixel smaller than the reference level value is selected and compensated for.

9. A CCD-defect compensating method for a camcorder as claimed in claim 8, wherein if pixel data having said absolute values |D(n−1)−D(n−3)| and |D(n+3)−D(n+1)| are greater or smaller than the reference level value, a value in which the two values are averaged is selected and compensated for.

10. A CCD-defect compensating apparatus for a camcorder comprising:

a pixel delay for sequentially delaying one field of channel pixel data of a target which is sampled/held in color-separating pulses according to color phases to be thereby separated into respective channel signals, and gain-controlled to a predetermined level;

a defect detecting portion for operating a specific pixel data delayed by said pixel delay and a pixel two stages behind from the specific pixel, and detect the presence or absence of a defect;

an averaging portion for, when a defect is created in nth pixel data delayed by said pixel delay, averaging pixels two stages preceding and behind the nth pixel having the defect to thereby obtain the data of the nth pixel having the defect;

a defect compensating control signal generator for deciding the position of the defect according to the defect detection result of said defect detecting portion and generating a defect compensating control signal; and a defect compensating portion for selectively compensating only for the pixel data averaged in said averaging portion or the pixel data having the defect and delayed in said pixel delay, according to defect compensating control signals generated from said defect compensating control signal generator and an externally input defect compensating control signal, and outputting the compensated data.

11. A CCD-defect compensating apparatus for a camcorder as claimed in claim 10, wherein said pixel delay is constructed to serially connect delays for delaying input pixel data for a predetermined time, respectively, corresponding to at least one field of pixels.

12. A CCD-defect compensating apparatus for a camcorder as claimed in claim 10, wherein said defect detecting portion comprises:

a first adder for operating the second pixel data delayed by said defect detecting portion and pixel data two stages behind the second pixel;

a second adder for operating the the sixth pixel data delayed by said pixel delay and pixel data two stages behind the sixth pixel;

first and second absolute value circuits for taking the absolute value of the results of said first and second adders; and first and second comparators for comparing the result of said first and second absolute value circuits with the reference level value to thereby detect the presence of the defect and generate binary numbers according to the result.

13. A CCD-defect compensating apparatus for a camcorder as claimed in claim 10, wherein said defect compensating control signal generator logically sums the binary numbers output from said first and second comparators of said defect detecting portion via a logic device to thereby output the result as a second defect compensating control signal, and outputting the binary numbers output from said first and second comparators directly as first defect compensating control signals.

14. A CCD-defect compensating apparatus for a camcorder as claimed in claim 10, wherein said averaging portion comprises:

a third adder for adding the third pixel obtained in said pixel delay to a pixel four stages behind the pixel; and averaging the added pixels.

15. A CCD-defect compensating apparatus for a camcorder as claimed in claim 10, wherein said defect compensating portion comprises;

a first pixel selector switched by said first defect compensating control signals of said defect compensating control signal generator and selectively outputting an external input, fifth and ninth pixel data obtained in said pixel delay, and a pixel having the defect compensated in said averaging portion;

a second pixel selector switched by said second defect compensating control signal of said defect compensating control signal generator and selectively outputting the output pixel data of said first pixel selector and the sixth pixel obtained from said pixel delay; and a third pixel selector switched by said externally input third defect compensating control signal and selecting the first pixel obtained in said pixel delay or the output pixel of said second pixel selector to thereby output the final pixel data having the defect compensated for.

16. A CCD-defect compensating apparatus for a camcorder as claimed in claim 11, wherein said delay is a D flipflop for delaying one pixel.

17. A CCD-defect compensating apparatus for a camcorder as claimed in claim 13, wherein said logic device is an OR gate.

* * * * *